(12) United States Patent
Brassel

(10) Patent No.: US 7,008,232 B2
(45) Date of Patent: Mar. 7, 2006

(54) METHOD FOR PRODUCING A MODELING SYSTEM FOR VESSEL DEFORMATIONS

(76) Inventor: Friedhelm Brassel, Ze den Rehwiesen 9, Duisburg (DE)

( * ) Notice: Subject to any disclaimer, the term of this patent is extended or adjusted under 35 U.S.C. 154(b) by 0 days.

(21) Appl. No.: 10/490,954

(22) PCT Filed: Sep. 30, 2002

(86) PCT No.: PCT/EP02/10955

§ 371 (c)(1),
(2), (4) Date: Aug. 6, 2004

(87) PCT Pub. No.: WO03/028978

PCT Pub. Date: Apr. 10, 2003

(65) Prior Publication Data

US 2005/0016548 A1    Jan. 27, 2005

(30) Foreign Application Priority Data

Sep. 29, 2001   (DE)   ................................. 101 48 341

(51) Int. Cl.
*G09B 23/28* (2006.01)
(52) U.S. Cl. .................................................... 434/268
(58) Field of Classification Search ................ 434/262, 434/267, 268, 272
See application file for complete search history.

(56) References Cited

U.S. PATENT DOCUMENTS

| 3,579,858 A | | 5/1971 | Bentov |
| 5,112,228 A | * | 5/1992 | Zouras ...................... 434/272 |
| 5,320,537 A | * | 6/1994 | Watson ....................... 434/272 |
| 5,947,744 A | * | 9/1999 | Izzat ........................... 434/272 |
| 6,062,866 A | * | 5/2000 | Prom .......................... 434/268 |
| 6,205,871 B1 | * | 3/2001 | Saloner et al. ............. 73/866.4 |
| 6,517,354 B1 | * | 2/2003 | Levy ........................... 434/262 |

* cited by examiner

*Primary Examiner*—Kurt Fernstrom
(74) *Attorney, Agent, or Firm*—Reed Smith LLP; Stanley P. Fisher, Esq.; Juan Carlos A. Marquez, Esq.

(57) ABSTRACT

Method for the production of a modeling system (1) for aneurysms involving the steps:
Local heating of a first hollow body which is suited for conducting liquid and is comprised, at least in one or more partial areas, of a flexible, thermoplastically deformable material. The local heating is effected on at least one of the partial areas until the thermoplastically deformable material softens. The invention also involves subjecting this first hollow body to the action of pressure that is great enough to cause a deformation at the heated location, whereby the size of the deformation is determined by the duration of the pressure applied and/or by the intensity of the pressure applied.

55 Claims, 4 Drawing Sheets

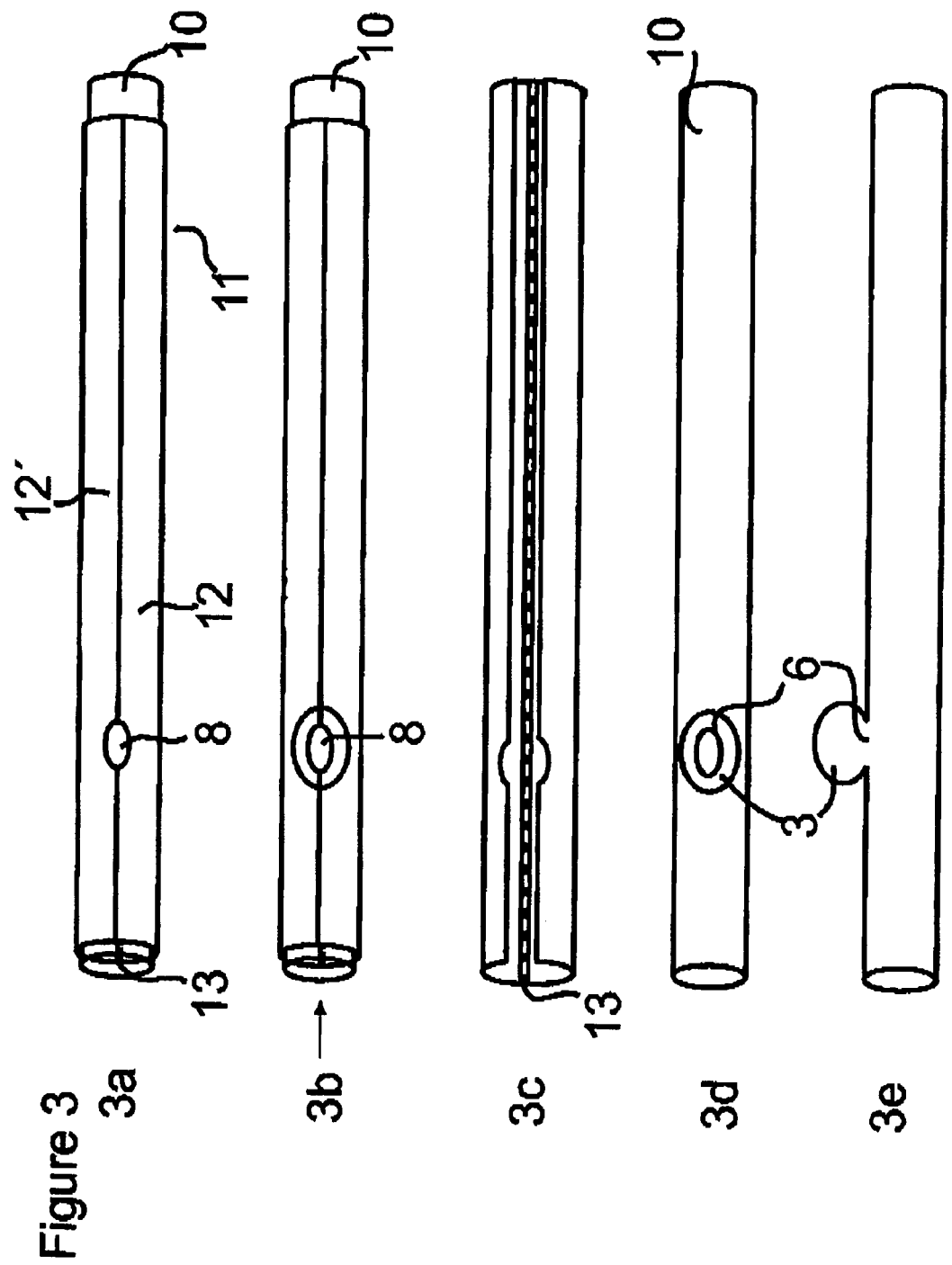

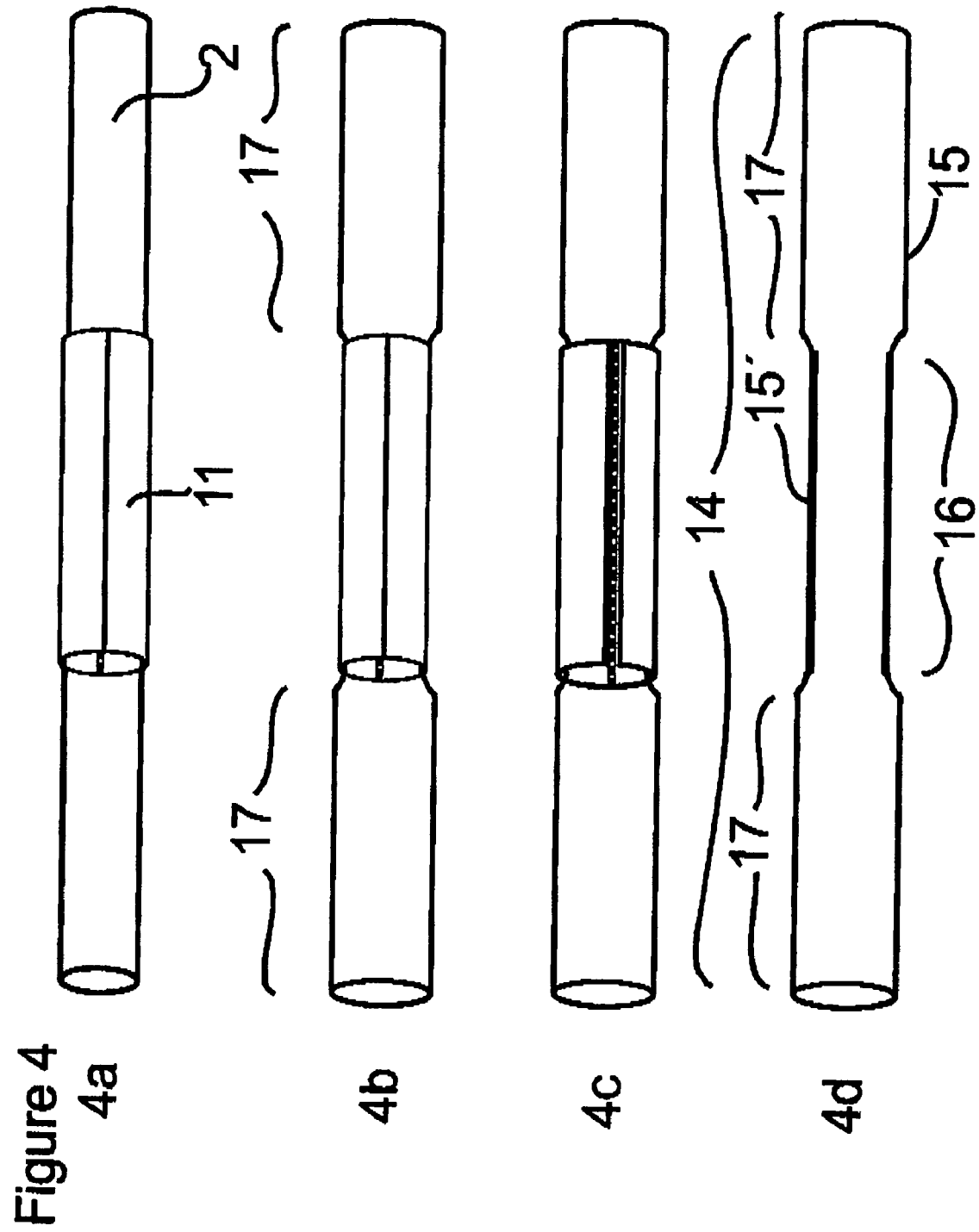

METHOD FOR PRODUCING A MODELING SYSTEM FOR VESSEL DEFORMATIONS

The invention relates to a method for the production of a modeling system for vessel malformations, in particular aneurysms and stenoses, as well as modeling systems made according to this method and their use in the medical sector.

Diseases of the cardiovascular system caused by unhealthy eating habits, stress and/or a physical predisposition count among the most frequent causes of death encountered in society today. In the field of cardiovascular diseases the congenital or acquired vessel malformations such as for example aneurysms or local vessel constrictions (stenoses) are found rather frequently.

Aneurysms are thin-walled protuberances encountered in the vascular system which are caused, inter alia, by a weakness of the wall of the affected vessel. Such aneurysms are treated by surgical-operative methods (e.g. "aneurysm clip") or by means of endovascular techniques. The endovascular treatment of aneurysms involves the introduction of material needed for the occlusion of the aneurysm through the vascular system and transfer of said material to the point where the aneurysm to be occluded is located. In that location the material (e.g. polymers hardening in the blood, fibers of various kind or thrombosizing spirals) is placed in position and the catheter removed from the blood vessel system. Another therapy method is the placement of stents (i.e. vascular endoprostheses) over the branching point of the aneurysm in the relevant blood vessel. If successful such a method enables the normal flow of blood to be restored while preventing blood from entering or restricting the blood flow into the aneurysm so that the blood present in the aneurysm coagulates. If thought expedient, tissue sclerotization materials ("tissue adhesives") may additionally be used. It is the objective of all these measures to bring about a stable occlusion of the aneurysm through the cicatrization of the thrombus that has formed.

Transferring the occlusion agent to the destination site calls for great expertise all the more so since aneurysms not only occur in the area of the large pathways but are also found frequently in difficult to access vessel sections such as the cranial or cerebral arteries. Mistakes made when transferring the catheter or placing the occluding material are associated with great risks for the patient because vessel wall injuries, fragments of broken-off occlusion spirals floating in the blood stream, occluding material flushed out of the anneurysm and entering the blood vessel system or washed-out thrombs will most probably cause embolism and tissue infarcts which in the worst case may result in the death of the patient.

For the purpose of training endovascular manipulation and the placement of the occluding materials it is known to make use of a model system for aneurysms that consists of a glass tube system with bulging-out sections; said system can be filled with liquid. This system can be used to try out new surgical techniques before such methods are applied to animals or human beings. Furthermore, inexperienced surgeons may use this system to exercise themselves in endovascular-therapeutic techniques.

A disadvantage of this system is that the glass tubes and bulges formed-out in the glass tubes have properties entirely different from the characteristics of natural blood vessels and aneurysms. In particular, the glass tube system differs from blood vessels in that it lacks elasticity and has a much greater stability so that even when the occlusion materials have been successfully placed within the glass tube system it cannot be ensured that this technique may also be applied in vivo without causing health risks for the patient. Another drawback of this model system is that it is very expensive due to the fact that the glass tubes and deformations must be handblown and manually formed out. Lower-priced non-elastic vessel models made of plexiglass or hard plastic material basically suffer similar disadvantages.

A comparable problem area is linked with the endovascular-therapeutic treatment of stenotic vessel sections: vascular stenoses are congenital or acquired constrictions of the vessels. The most common cause of acquired vessel stenoses are atherosclerotic vessel malformations characterized by hardening, thickening and loss of elasticity of the affected vessels and ultimately leading to a constriction of the vessel volume. Aside from and supplementary to medicational therapy forms endovascular-therapeutic techniques are primarily applied such as the balloon dilatation or placement of stents to be used as vascular supporting elements to keep the lumen open, as a rule a combination of both methods. In this case as well modeling systems are needed for the development and testing of suitable therapy forms due to the fact that the known rigid systems are of very little use only when it comes to imitate or reproduce actual in vivo conditions.

In view of the drawbacks associated with the state of the art it is thus the object of the invention to provide a cost-effective modeling system for vessel malformations which imitates or reproduces the properties of blood vessels and vessel deformations better than the model systems of the known state of the art.

This objective is to be achieved in accordance with the invention by a method for the production of a modeling system for vessel malformations involving the following steps:

a) local heating of a first hollow body which is suited for conducting liquid and consists, at least in one or more partial areas, of a flexible, thermoplastically deformable material, such local heating being effected on one or more partial areas until the thermoplastically deformable material softens, and b) subjecting the hollow body to a pressure that is high enough to cause a deformation at the heated location, with the size and shape of the deformation being governed by the duration of the pressure applied and/or by the intensity of the pressure applied.

The deformations produced by the method according to the invention may, in particular, be used to recreate deformations of the vessel wall such as aneurysms or for the replication of expanded vessel segments.

The method, therefore, lends itself to produce deformations that, for example, have a wall thickness severely reducing from the base towards the dome and whose lacerability, due to the flexibility of the thermoplastically deformable material, is more similar to that of aneurysms than can be achieved with traditional modeling systems. Furthermore, with the aid of the inventive method models of vessel stenoses can be produced; in this case the deformations will represent the unchanged segments of the vessel whereas the non-deformed partial areas of the hollow body correspond to the stenotic vessel sections. Other than with the rigid vessel models the models provided by the method is according to the invention will not only reproduce the differences in size of the inner lumen but also differences in elasticity existing between the stenotic and non-stenotic vessel areas. As a rule, for the reproduction of stenoses a softer and more flexible plastic material (that has better thermoplastic deformability characteristics requiring less force to be exerted) is used to simulate expansion characteristics.

As a result of the flexibility of the thermoplastically deformable material the elasticity of the vessel system is reproduced so that the model system generated in accordance with the invention reflects the situation actually existing in the body more precisely than can be achieved by the customary artificial systems available according to the state of the art. For example, aside from the shaping of vessel malformations their elasticity and fragility can also be reproduced and in this way differences which exists with respect to the "physiological" vessel segments can be simulated by selecting materials and material properties suited for the relevant purpose.

When the deformation has been shaped out and the thermoplastic material cooled down to a temperature lower than its softening point the modeling system according to the invention may at once be filled with a liquid and put to use, for example to try out or study endovascular-therapeutic techniques.

However, when producing the system for stockkeeping purposes it is thought expedient that, after manufacture in accordance with the invention has been completed, the hollow space of the first hollow body is filled with air or inert gas and sealed off so as to be air-tight. In this manner the deformations will remain stable and retain their original shape even when stored for a prolonged period of time (e.g. lasting severable months). In such cases, before it is used for the intended purpose the modeling system produced in accordance with the invention will be opened by cutting the closure locations off or open. Expediently, the closure is effected by fusing or bonding together the openings of the hollow body filled with pressurized gas. Nevertheless, basically acceptable is every method by means of which the stable shape of the produced deformations can be warranted.

It will also be appropriate if at least the produced deformation and preferably the entire first hollow body are designed so as to be translucent or basically transparent, so that, for example, it may be easily viewed from the outside whether a tested method has been successful. Especially expedient in this context is the use of a first hollow body that is translucent in its entirety and, in particular, basically transparent for the purpose of implementing the method according to the invention.

As per an especially expedient embodiment of the invention the entire first hollow body is made of a flexible material because the difficulty linked with maneuvering endovascular catheters intravascularly is mainly due to the fragility and elasticity of the vascular system. Such an embodiment offers the advantage that not only the area where the deformation is situated reflects characteristics quite similar to those found in the organism but all other partial areas of the hollow body as well. In this manner it is possible, for instance, to determine already in the stage of learning endovascular techniques requiring a micro-catheter to be moved towards the site of the deformation (for example an artificial aneurysm) whether an excessively traumatizing manipulation occurs. Furthermore, modeling systems produced by means of fully flexible first hollow bodies will simulate the characteristics of vessels through which blood circulates, for instance "surge tank effects" etc. Through the selection of suitable pumping systems pulsatile systolic-diastolic liquid pressures may be generated as they are actually occurring in the organism. Moreover, a particularly expedient hollow body in accordance with the invention is embedded in a—preferably hyaline—gel, for example gelatine, or in a plastic material having similar properties. This embodiment is especially suited to simulate the natural suspension of vessels and reticular vessel in the body.

In accordance with another preferred embodiment the entire first hollow body consists of a thermoplastic material. This embodiment is especially cost-effective and moreover allows deformations to be produced in any desired place of the first hollow body. Especially preferred in this context is an embodiment in that the entire first hollow body consists of a flexible, thermoplastically deformable material that, in addition, is transparent.

Basically, any kind of thermoplastically deformable material that can be processed without difficulty may be used. Particularly suitable as thermoplastically deformable materials are PVC (polyvinyl chloride), PUR (polyurethane), PP (polypropylene) or PE (polyethylene) because these may also be of flexible design. PVC is an especially preferred material. Through the selection of the material and dimensioning of the wall thickness of the first hollow body the above mentioned average person skilled in the art is capable of varying the elasticity of the model with a view to simulating certain vessels, reticular vessel structures or vascular malformation.

The local heating is preferably brought about by the local effect caused by a hot liquid, preferably a lipophilic liquid having a high boiling point, such as for example an oil; through the local effect caused by a flame, preferably a flame generated by a gas torch; through the use of a hot wire, especially a hot wire spiral that is applied locally from the inside or outside to the wall of the hollow body; or through exposing the body locally to microwaves. However, any kind of heating effect may basically be put to use provided it is capable of bringing about a local heating of the thermoplastic material associated with a softening effect. In this context, heating effected with the help of a gas flame is particularly cost-effective. On the other hand, using microwaves or hot liquids (for example paraffin oil) to heat the first hollow body enables a particularly precise thermal regulation to be achieved.

In accordance with an expedient embodiment the first hollow body represents a system of two-dimensionally arranged, communicating pathways (that may differ from each other to simulate the situation encountered in a natural vascular system, for instance with respect to diameter and/or length as well as shape which may be of winding or primarily elongated configuration), or part of such a system. For example, the first hollow body may thus be produced in a manner otherwise employed in the manufacture of printed circuit boards by sticking two, in particular flexible, plastic foils together sectionally by bonding or welding methods with the communicating pathways forming the vascular system or part thereof being left free. In this way a two-dimensional model of a vessel system is created said system being suitable to practice moving objects through branching vascular pathways in a precise target-seeking manner. Particularly, this method allows producing in a simple manner vessel models of winding configuration. For the manufacture of such a system a tear-resistant foil may preferably be used, said foil having, for example, a wall thickness roughly corresponding to that of average vessel walls.

In accordance with another preferred embodiment the first hollow body represents a hose, a two- or three-dimensional system of communicating (which means connected so as to be conductive) hoses (that may differ from each other to simulate the situation encountered in a natural vascular system, for instance with respect to diameter, wall thickness and/or length as well as shape which may be of winding or primarily elongated configuration), or part of such a system. In its most simple form as a hose the modeling system is especially cost-effective. On the other hand, a system of communicating hoses permits two- or three-dimensional models of the vascular system or parts thereof to be reproduced.

For the creation of the deformations any kind of pressure generation may be employed (for example, through hydrostatic, pneumatic or mechanical means). Pneumatically produced pressure is particularly suited because the generation of such a pressure is simple and inexpensive. Producing pressure hydrostatically is particularly suitable because pressure generated in this way simulates conditions prevailing during the development of natural aneurysms.

In accordance with an especially expedient embodiment of the inventive method the first hollow body, prior to local heating, is placed at least partially into a second hollow body consisting of a material that cannot be thermoplastically deformed, with at least a partial area of the second hollow body accommodating at least a partial area of the first hollow body in a form-closed manner. The shape of the second hollow body in this case is expediently adapted to the form of the first hollow body (hose, system of communicating hoses, two-dimensional system of communicating pathways or part thereof). The second hollow body may thus be designed as a thermoplastically non-deformable tube of which at least a partial area is suited to accommodate in a form-closed manner a first hollow body having the form of an appropriately shaped hose. In this way, the hose can be shaped out in a defined manner after it has been placed into the tube.

It is thus especially expedient if the second hollow body has at least one cut-out, in particular one or several cut-outs that have an ellipsoidal or annular shape. In this embodiment of the invention the second hollow body is preferably suited for the production of systems modeling pathological vessel ballooning, in particular aneurysms. In this manner, deformations whose position can be precisely determined on the first hollow body can be created by heating the partial areas of the first hollow body, said areas being arranged underneath the cut-outs when part of or the entire first hollow body is accommodated within part of or the entire second hollow body. In this way it is possible to predetermine exactly the type of aneurysm and its neck diameter by selecting a defined (for example ellipsoidal or annular) cut-out having a defined diameter. Various types of deformations (for example fusiform or aciniform aneurysms) of various diameters can thus be produced.

It may be expedient in this context if the second hollow body (for instance made of glass, thermoplastically non-deformable plastic or metal) consists of a single piece with the first hollow body remaining inside the second after the deformations have been produced. In this way two-shell models of vascular malformations can be created wherein the outer, second hollow body not only may determine the starting form and size of the deformations but also the shape of the first hollow body: For example a first hollow body designed as a customary hose of thermoplastic material is placed in a second hollow body which has the shape of a bent tube provided with cut-outs. This will enable the convolutions of the vessel bearing the malformation which are situated before or after the malformation to be exactly reproduced without the necessity of having to mount a first hollow body which is appropriately preformed. This implementation form of the method according to the invention is particularly inexpensive because first hollow bodies of especially simple construction (e.g. conventional hoses) and prefabricated second hollow bodies (e.g. made of plexiglass, glass or metal) can be employed. After the produced modeling system has been used the first hollow body is disposed of and the second hollow body is available for re-use. It is especially expedient here if both hollow bodies are basically transparent.

As per another preferred implementation form of the manufacturing method in accordance with the invention a second hollow body is used which consists of at least two portions which can be interconnected with each other and at least partially disconnected, the connection of which is at least partially separated to allow the first hollow body to be accommodated prior to the method being carried out and removed after implementation of the method has been completed. The second hollow body may thus consist of two portions that can be completely disconnected from each other or, in accordance with a particularly preferred embodiment, may comprise two rotatably connected parts so that the body can be snapped open or close. For the accommodation of the first hollow body the second hollow body is opened and then closed again before heating and generation of the deformations takes place.

For this purpose combinations of metal plates or plates of some other suitable material as well as suitable foils, especially plastic foils, may expediently be used. Particularly expedient are molding die plates that can be heated and are thus capable of heating up the foil material. The heated foil material can then be exposed to pressure and/or vacuum so that the first hollow body is produced.

Pressure and/or vacuum may in this case be employed to produce a first hollow body tailored to satisfy individual requirements.

After the deformations have been created and, if thought necessary, the first hollow body has been closed off so as to be air-tight (especially by bonding or welding) the second hollow body can simply be snapped open enabling said first body to be easily removed. In this case, the second hollow body functions in the same way as a molding die.

Such a design of the second hollow body offers the advantage in that it is also well suited for implementing the method in combination with first hollow bodies that do not have the form of tubes. It is particularly expedient for the cut-outs to extend over both parts of the second hollow body so that the edges of the hollow body forming the cut-outs come apart when the second hollow body is opened resulting in the cut-outs to widen upon opening the second hollow body. In this embodiment the first hollow body can be taken out of the second hollow body after the deformations have been created without running the risk of damaging the first hollow body and the deformations produced.

For the creation of artificial aneurysms it is beneficial if local heating is applied in the form of heat directed to spots of a predefined small area. It is particularly appropriate in this context if the second hollow body has at least one cut-out and the first hollow body having been introduced into the second hollow body is heated in a spot-like manner from the outside in at least one of the areas located under the cut-outs prior to being subjected to pressure.

An additional advantage of the method according to the invention is that aside from protuberances other deformation types and in this way other types of vascular malformations can be simulated. For example, model systems of stenotic vessels can thus be produced that comprise deformations corresponding to vessel sections which are not constricted whereas sections of the first hollow body remain in their original state and thus represent the stenotic segment. In this way not only can local constrictions characteristic of stenotic areas be reproduced but also the elasticity and thickness of the vessel walls which show major differences in the stenotic and physiologically sound segments. For this purpose a second hollow body is most expediently used. It is particularly advantageous to employ a tubular second hollow body and a first one comprising a hose segment whose shape fits in a form-closed manner into the second hollow body of tubular design, with the longitudinal dimension of said first body exceeding the length of the second hollow body so that after a partial area of the hose segment has been placed inside the tube and such partial area or areas of the hose segment not located inside the tube have been subsequently heated up and subjected to pressure a dilatation of this or these areas will take place. However, the non-heated partial area which is embraced by the form-closed tube will maintain its original diameter as well as its original wall thickness.

Furthermore, the invention relates to a modeling system for vascular malformations which is manufactured in accordance with the above described method. Preferred in this context are vascular models for aneurysms and/or stenoses. Especially expedient here is a modeling system according to the invention wherein the thickness of the walls that enclose the hollow space of the hollow body and/or the diameter of the first hollow body essentially correspond to the dimensioning of blood vessels as they exist in humans or animals. The dimensioning with respect to inside diameter, wall thickness or overall diameter in this case depends on the type of vessel or vessels to reproduced by the model. Such a dimensioning may vary from modeling system to modeling system and in the case of complex modeling systems even dimensioning of the different artificial vessels may vary greatly. Surely, an aneurysm-carrying vessel located close to the aorta has other dimensions than a cerebral endartery. However, these dimensions are sufficiently known to the above mentioned average person skilled in the art. Tests performed by the inventor showed that inside diameters ranging between 0.5 and 30 mm and wall thicknesses between $\leq 0.3$ and 4 mm are particularly expedient. (These dimensions do not relate to the non-deformed partial areas of the first hollow body. Same as the natural vascular malformations the deformations may of course have significantly smaller wall thicknesses and significantly greater inside diameters.)

Simple modeling systems which basically consist of a pathway or a hose wherein a deformation has been created are particularly inexpensive. More complex modeling systems serve to represent communicating vessel systems which are very well suited to simulate and clarify, for example, the influence the main blood flow vectors have on constricted or dilatated vascular segments or protuberances.

Furthermore, the invention relates to an arrangement consisting of a modeling system according to the invention and a liquid pumping system that serves to supply a liquid to the modeling system. In an especially preferred embodiment an isotonic common salt solution, artificial blood or fresh blood is used as liquid or any other liquid that is either especially inexpensive or, to the extent possible, has characteristics comparable to natural blood.

Which type of pumping system is to be used depends on the effects that are intended to be achieved and can be easily selected by the above mentioned average person skilled in the art. Customary roller or piston diaphragm pumps are cost-effective and permit hydrostatic pressures to be generated that correspond to the natural blood pressure. In order to simulate the cushioning properties of blood vessels peripheral resistors that can be regulated may expediently be arranged upstream and/or downstream. The simulation of complex flow systems in the artificial vascular system (backflow, pulsatility, pressure and frequency variations, adapted to physiological and/or pathological conditions existing within the organism) may expediently be achieved with the aid of computer-controlled pumping systems (e.g. computer-controlled piston-diaphragm pumps). In this case it is especially appropriate to use a pumping system that enables pressure of variable intensity to be applied. It is also considered expedient if the pumping system permits liquid to be applied in a manner that enables a hydrostatic pulse to be generated the frequency and/or rhythm of which can be varied. To enable the inventive arrangement to be used in conjunction with nuclear magnetic resonance imaging (NMR) it is expedient for the pumping system to be constructed of non-magnetic components and, for example, consist entirely of plastic material. The drive in this case may, for example, be located outside the tomograph or be of pneumatic type.

In accordance with another expedient embodiment the arrangement according to the invention is equipped with a visual recording system. For this purpose conventional video systems with enlarging lenses or digital recording systems are suited. If thought appropriate imaging methods may be employed in this context such as computed tomography, MLT, NMR or other methods known to the above referred to skilled person.

The invention furthermore relates to the use of a modeling system according to the invention or an inventive arrangement in the medical field. They are in particular suited for the examination of the effects of medicine influencing blood coagulation or thrombosis; the development, testing or improvement of medical appliances for the therapy of vascular malformation preferably aneurysms; the development, testing or improvement of medical treatment methods for the therapy of aneurysms in vitro; the basic and advanced training of physicians or other health personnel, or the analysis of the flow conditions existing in and around vascular malformations.

For example, a simulation and examination of the flow characteristics of blood in aneurysms and stenotic vessels may be carried out preferably by introducing a contrast medium and performing a simultaneous analysis using one of the above described image-forming methods. In this way it is also possible to examine new contrast media and their spreading behavior within the vascular system in the event of vessel malformations. For the purpose of visualizing hemodynamic spreading characteristics it is therefore expedient if the contrast medium used and the carrier liquid representing the blood are of different color.

The invention shall now be described in more detail by way of preferred embodiment examples as shown in the following figures.

FIG. 3 is the enlarged schematic representation of how an artificial aneurysm 3 is generated with the help of a molding die 11;

FIG. 4 shows schematically and as an enlarged representation the steps involved in the production of a modeling system 1 for vessel stenoses.

Figure 1:
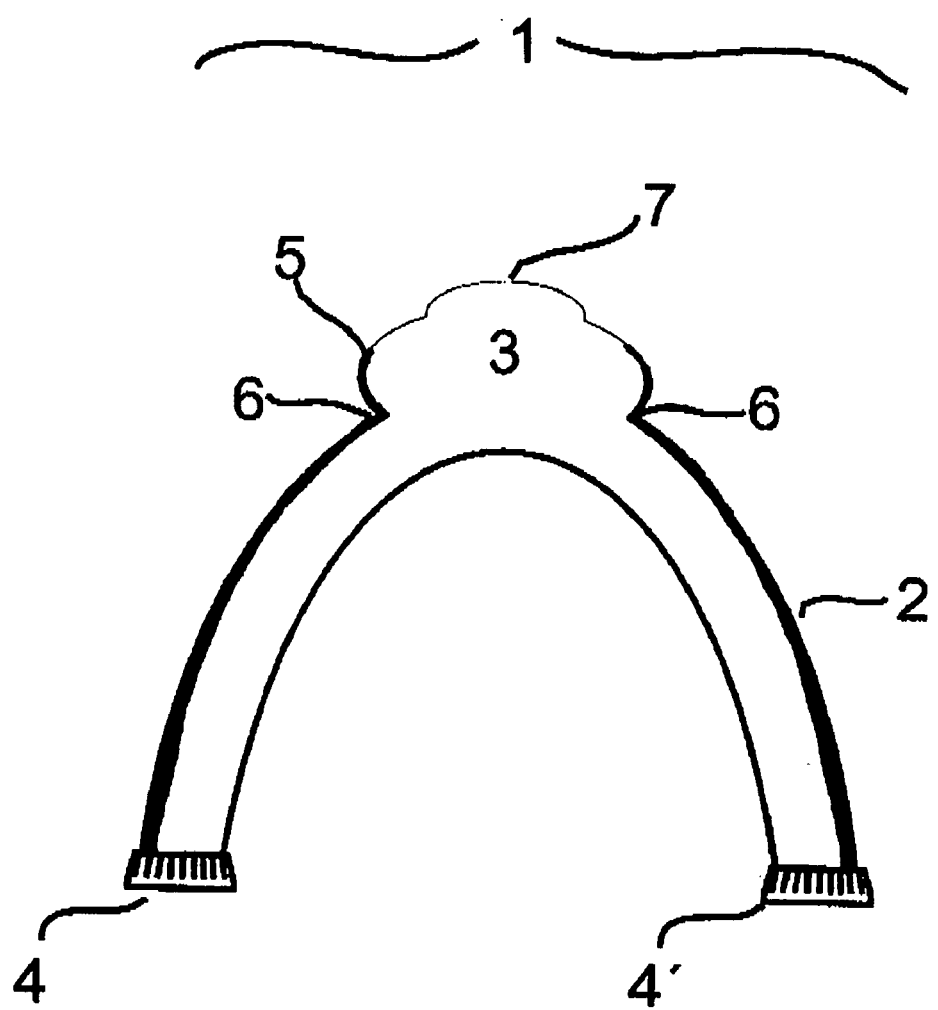
FIG. 1 is an enlarged side view of a simple aneurysm hose model 1.

FIG. 1 represents a modeling system 1 for an aciniform aneurysm of an intracranial artery which is made of a PVC hose 2. The elastic PVC hose 2 has an inside diameter of 1.5 mm and a wall thickness of 0.65 mm. For the purpose of reproducing the artificial aneurysm 3 the hose 2 was locally (spot-wise) heated by means of a gas flame to a temperature in the softening range of the PVC material. At the same time using a conventional pressure pump the hose was filled with compressed air at a pressure of 0.5 bar resulting in the artificial aneurysm 3 to form at the locally heated spot. Subsequently, the artificial aneurysm 3 together with the gas present within the aneurysm was cooled down. Cooling was carried out with slight pressure being applied simultaneously to prevent the aneurysm from collapsing prematurely. Finally, both ends 4/4' of hose 2 were sealed off so as to be air-tight by welding under slight pressure so that the artificial aneurysm 3 remained stable for a longer period of time.

As far as elasticity and structure are concerned the artificial aneurysm 3 resembles natural aneurysms, especially because it consists of flexible material and its wall 5 reduces significantly from the base of the aneurysm 6 towards the dome 7. Similar to the natural situation found in the human blood system the rather thin-walled dome 7 of the artificial aneurysm 3 is particularly fragile, said fragility even increasing when pressure is applied through the introduction of liquid.

The modeling system 1 shown is particularly suited for testing novel therapy forms and diagnostic methods as well as for training purposes. Both ends 4/4' of hose 2 are cut open and connected, so as to be conductive, with a liquid pumping system, for example a diaphragm piston pump. The connection is made by joining hose 2 to the pump using a Y-type coaxial sealing system hooked up to the ends of hose 2. By applying pressure in a pulsating manner with artificial blood heated to 38° C. the human pulse is simulated. For this purpose hydrostatic pressures ranging from 50 to 250 mm Hg are generated. To enable pressure, frequency and rhythm of the liquid applied in a pulsatile manner to be varied a computer is provided and used in conjunction with the pump so that various physiological and pathological conditions of the circulation system can be simulated.

In this case the modeling system 1 with the exception of its two hose ends 4/4' is placed in a basin filled with a liquid heated to 38° C. Since the artificial blood and the liquid into which the modeling system 1 has been immersed have been heated up endovascular instruments and mechanical occlusion devices behave very much like being located in the body as far as their bending characteristics and torsional stability are concerned. The same applies to the elasticity of the hose 2 representing the vessel on which the aneurysm is located. Embedding the modeling system 1 in surrounding liquid will, for example, result in an external resistance affecting the "surge tank" properties of hose 2 and the pulsatile behavior of the aneurysm 3.

For the purpose of implementing the endovascular method which is to be developed, tested or learned the user introduces, for example, a micro-catheter via a hemostatic valve with Y-type branch into the open hose 2 and guides it towards the base 6 of the artificial aneurysm 3. At this point, placement of a polymerizing material or an occlusion spiral is effected, for example. Since both the hose 2 representing the vessel and the artificial aneurysm 3 are designed so as to be elastic and have surface characteristics similar to that of natural blood vessels or aneurysms mistakes in guiding and/or introducing the occlusion material into the artificial aneurysm 3 can be better detected than with customary glass modeling systems. In this way, the surgeon will feel if the moved object abuts or gets caught within the hose 2 and, moreover, there may also be the risk that a severely traumatizing action will cause a rupturing of the artificial aneurysm 3. Due to the fact that the modeling system 1—same as conventional glass systems—is transparent it furthermore offers the advantage that endovascular maneuvering may be easily viewed from the outside and, if thought necessary, recorded.

Figure 2:
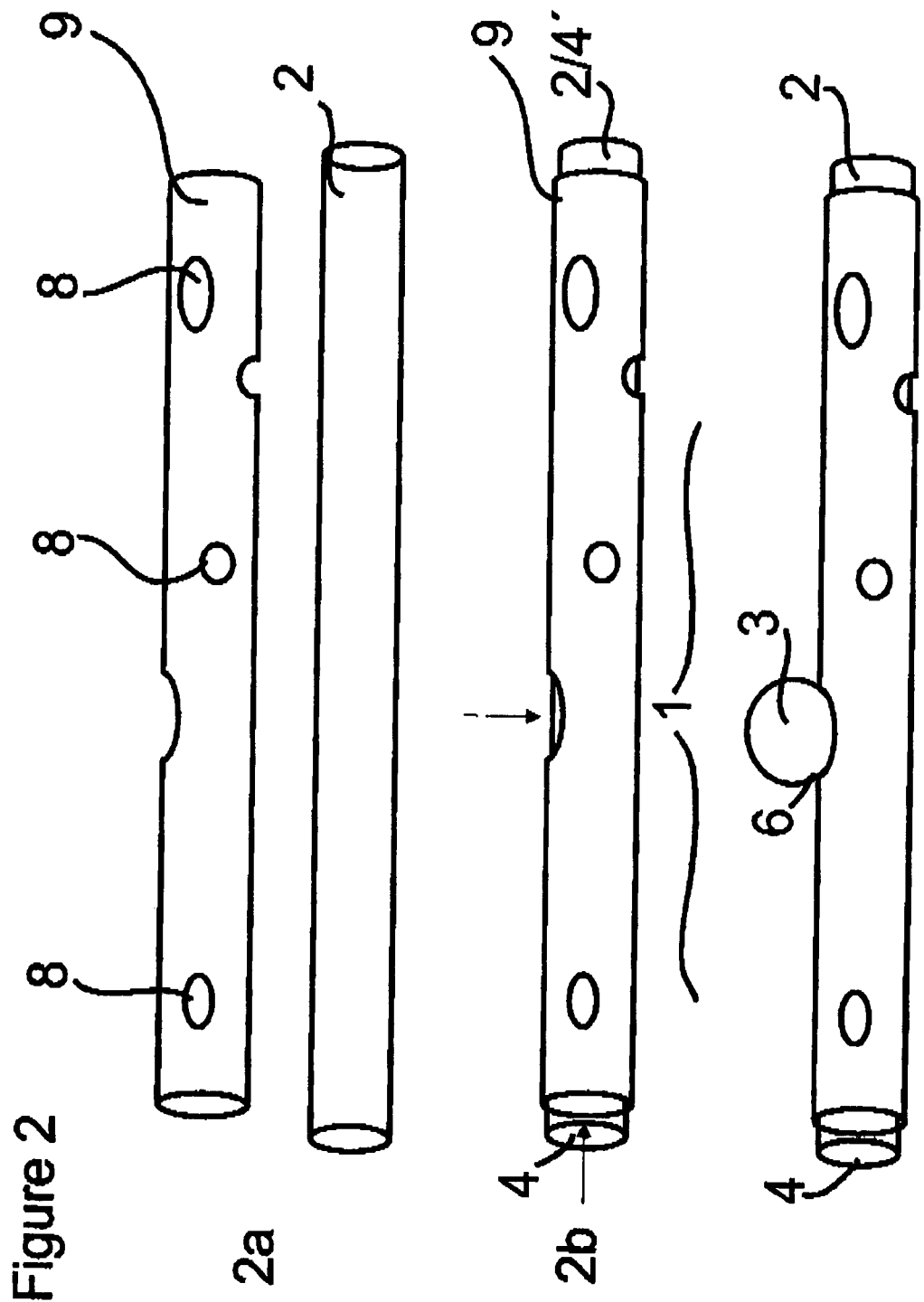
FIG. 2 illustrates the steps involved in the production of a two-shell modeling system 1' for aneurysms in enlarged and schematic representation.

FIG. 2 is a schematic representation of the steps involved in the manufacture of a two-shell modeling system 1' for aneurysm. To create the two-shell modeling system 1' in accordance with the invention an elastic polyethylene hose 2 of an inside diameter and wall thickness typical of the vessel to be reproduced is placed into a copper tube 9 having ellipsoidal and annular cut-outs 8 of various dimensions, the inner lumen of said tube being sized such that it is suited to accommodate the polyethylene hose 2 in a form-closed manner. After the polyethylene hose 2 has been pushed into the copper tube 9 (see FIG. 2b) it is locally heated spot-wise from the outside by a precisely dosed exposure to microwaves until the softening point of polyethylene has been reached. The spotwise heating from the outside is applied to a partial area of the polyethylene hose 2 which is accessible from the outside through one of the cut-outs 8 provided in the copper tube 9. Prior to heating, one end 4' of the polyethylene hose 2 is closed off by fusing so as to be tight to air. Following this the other end 4 is connected with a conventional diaphragm piston pump via a coaxial sealing system in a manner so as to be conductive.

After heating has taken place and the softening point of the material reached pressure is applied by means of the diaphragm piston pump which has been set to inject a defined amount of air into hose 2 for a predetermined period of time. This not only determines the size of the deformation to be created but also makes sure that the soft spot will remain intact and will not break as a result of too high a pressure being applied or dilatation taking place too quickly. Due to pressure being applied to the hot spot a deformation will form as illustrated in FIG. 2c, said deformation constituting the artificial aneurysm 3. Similarly, the creation and modulation of the deformation may be brought about by applying vacuum externally to the hose (or making use of a combination of applying pressure internally and creating a vacuum external to the hose). Subsequently, the two-shell model 1' generated in this way may be employed directly for the teaching or development of medical techniques or prepared for later use by welding and thus sealing off the still open end 4 in a manner to be air-tight.

The two-shell model 1' shown in FIG. 2c is particularly suited for the exact replication of vessel segments located before and after the aneurysm (e.g. in the form of defined convolutions or, as illustrated in the figure, as a precisely straight vascular run). Moreover, this two-shell model 1' enables the size of the neck of the aneurysm 6 and of the aneurysm 3 to be exactly determined. When the two-shell model 1' shall be used the two closed off ends 4/4' are opened up and liquid is injected into the model 1'. Afterwards, the flexible hose 2 carrying the aneurysm 3 can simply be removed from the copper tube 9 and disposed of. The copper tube 9 on the other hand can be reused many times. It is also expedient if the copper tube 9 is provided with a longitudinally arranged seam along which it can be folded open (refer to the example shown in FIG. 3).

FIG. 3 illustrates the steps involved in the manufacture of artificial aneurysms based on a three-dimensional system of communicating hoses, of which only portion 10 has been shown here. In the same way an aneurysm model system may of course be produced using a single hose (analogously to what has been shown in FIG. 2 as an example). In this example the desired artificial aneurysms 3 are produced with the help of a tubular molding die 11. This die consists of two parts 12/12' which are connected at one edge by means of a hinge joint 12 allowing a folding movement of both portions so that the molding die 11 can be opened or closed by appropriately slewing the two parts 12/12' either against or away from each other. To place the tubular partial area 10 of the three-dimensional system of communicating hoses into the molding die 11 the molding die 11 is opened. It is closed again after the partial area 10 has been placed in position. For the purpose of closing the two parts 12/12' of the molding die 11 firmly at the edges not connected by the hinge joint 13 they are provided with latch-type connections which can only be disengaged by applying a slight mechanical pressure. In this way the molding die 11 is prevented from being opened through the pressurizing action occurring while the artificial aneurysm 3 is produced. On the other hand, this connection allows the two parts 12/12' to be easily separated.

Cut-out 8 which is used to predetermine the form of the artificial aneurysm 3 to be produced is located on both parts 12/12' of the molding die 11 such that it spans over the free edges of the two parts 12/12'. After the artificial aneurysm 3 has been formed the partial area 10 together with the artificial aneurysm 3 produced may easily be removed from the opened molding die 11. Molding dies 11 in which several, possibly differently sized cut-outs 8 are located along the free edges of the die portions are also considered expedient because this would permit one or several and/or, if necessary, differently dimensioned or positioned aneurysms 3 to be produced as desired with a single molding die 11.

After closing the molding die 11 and heating up the partial area 10 at a defined spot located under the cut-out 8 an aneurysm of predetermined size is produced by applying pressure (see arrow, FIG. 3*b*). Subsequently, the partial area 10 is removed from the molding die 11 which for this purpose is first opened, as illustrated in FIGS. 3*c* and 3*d*. The three-dimensional system of communicating hoses may then be put to use without the molding die 11. By way of the method shown schematically artificial aneurysms of a predetermined sizing of the neck 6 can be produced (refer to FIGS. 3*d* and 3*e*). When the aneurysm 3 has been produced further vascular malformations or aneurysms may be created, if necessary, on the same or other partial areas of the three-dimensional system of communicating hoses until the desired modeling system is complete.

The modeling system so generated is then placed in a basin filled with hardening gel so that after the gel has cured or set the three-dimensional form of the system is stabilized without the model system's elasticity being completely impaired. The gel also serves as a kind of peripheral resistance and cushioning of the "surge tank" characteristics comparable to tissue or cerebrospinal fluid surrounding the cerebral vessels so that such an arrangement is particularly suited when cerebral vascular networks are to be reproduced.

FIG. 4 shows an example of how a modeling system 14 for stenotic vessels is produced. For this purpose a flexible polyethylene hose 2 having an inside diameter of 6.0 mm and a wall thickness of 1.5 mm is placed in a form-closed molding die 11 that can be folded open. Following this, segments 17 of hose 2 which are not surrounded by the molding die 11 are heated locally from the outside by means of hot paraffin oil until the softening point has been reached and are then dilatated by applying pressure. As shown in FIG. 4 the molding die is then opened and the modeling system 14 so generated is removed after the molding die 11 has cooled down. Furthermore, as can be seen from FIG. 4*d* the modeling system 14 does not only simulate the differing sizing of the inner lumen of stenotic vessels but also the different thickness of the vessel wall 15 and 15' of the stenotic 16 and physiological segments 17. As a result of the different wall thicknesses the elasticity characteristics of the various vessel segments 16/17 differ as well in the modeling system of stenotic vessels 14 to reflect conditions as actually existing in the body.

What is claimed is:

1. A method for the generation of a modeling system for vascular malformations, comprising:
    a) local heating of a first hollow body which is suited for conducting liquid and consists, at least in one or more partial areas, of a flexible, thermoplastically deformable material, such local heating being effected on at least one of the partial areas until the thermoplastically deformable material softens, and
    b) subjecting the first hollow body to a pressure that is high enough to cause a deformation at the heated location, with the size of the deformation being governed by the duration of the pressure applied and/or by the intensity of the pressure applied.

2. The method according to claim 1, wherein a hermetic closure of the first hollow body subjected to gas pressure after the deformation has been produced.

3. The method according to claim 2, wherein the closure is effected by fusing or bonding together openings of the first hollow body.

4. The method according to claim 1, wherein at least the deformation produced and preferably the entire first hollow body is formed to be translucent or transparent.

5. The method according to claim 1, wherein the entire hollow body consists of flexible material.

6. The method according to claim 1, wherein the entire hollow body consists of thermoplastically deformable material.

7. The method according to claim 6, wherein the thermoplastically deformable material is PVC, PUR, PP or PE.

8. The method according to claim 1, wherein the local heating is brought about by the local effect caused by a hot liquid through the local effect caused by a flame, preferably a flame generated by a gas torch, through the local application of a hot wire, preferably a wire spiral or coil, or through the locally confined exposure to microwaves.

9. The method according to claim 8, wherein the hot liquid is a lipophilic liquid having a high boiling point.

10. The method according to claim 8, wherein the local heating is achieved through the application of a heat source external to the hollow body.

11. The method according to claim 1, wherein the first hollow body is a system of two-dimensionally arranged pathways communicating with each other, or part of such a system.

12. The method according to claim 11, wherein the system is produced by sticking together sectionally two plastic foils arranged one on top of the other by welding or bonding methods.

13. The method according to claim 12, wherein the plastic foils are made of tearproof material.

14. The method according to claim 1, wherein the first hollow body is designed as a hose, system of communicating hoses or part of such a system.

15. A method according to claim 1, wherein the first hollow body, prior to heating, is placed at least partially into a second hollow body consisting of a material that cannot be thermoplastically deformed with at least a partial area of the second hollow body accommodating at least a partial area of the first hollow body in a form-closed manner.

16. The method according to claim 15, wherein the second hollow body is of heatable construction and also effects heating of the first hollow body.

17. The method according to claim 15, wherein the second hollow body is provided with at least one cut-out.

18. The method according to claim 17, wherein the cut-out has an ellipsoidal or annular shape.

19. The method according to claim 15, wherein the second hollow body is of one-piece construction and the first hollow body remains in it after the deformations have been produced.

20. The method according to claim 15, wherein the second hollow body consists of at least two portions which can be interconnected with each other and at least partially disconnected, the connection of which is at least partially separated to allow the first hollow body to be accommodated prior to the method being carried out and removed after implementation of the method has been completed.

21. The method according to claim 18, wherein the second hollow body consists of two parts that are slewably connected and can be snapped open or closed.

22. The method according to claim 15, wherein the second hollow body has a tubular form.

23. The method according to claim 15, wherein the local heating is applied in a spotwise manner.

24. The method according to claim 21, wherein the second hollow body has at least one cut-out and the first hollow body having been introduced into the second hollow body is heated in a spot-like manner from the outside in at least one of the areas located under the cut-outs.

25. The method according to claim 22, wherein the first hollow body comprises a hose segment that fits in a form-closed manner into the second hollow body of tubular design, with the longitudinal dimension of said first body exceeding the length of the second hollow body so that after a partial area of the hose segment has been placed inside the tube and such partial area or areas of the hose segment not inside the tube have subsequently been heated up and subjected to pressure a dilatation of this or these areas will take place, with the non-heated partial area which is embraced by the form-closed tube will maintain its original diameter as well as its original wall thickness.

26. A modeling system for vascular malformations formed by the method comprising the steps of:
a) local heating of a first hollow body which is suited for conducting liquid and consists, at least in one or more partial areas, of a flexible, thermoplastically deformable material, such local heating being effected on at least one of the partial areas until the thermoplastically deformable material softens, and
b) subjecting the first hollow body to a pressure that is high enough to cause a deformation at the heated location, with the size of the deformation being governed by the duration of the pressure applied and/or by the intensity of the pressure applied.

27. The modeling system according to claim 26, wherein the thickness of the walls that enclose the hollow space of the first hollow body and/or the diameter of the first hollow body correspond to the dimensioning of blood vessels as they exist in humans or animals.

28. An arrangement comprising a modeling system as well as a pumping system for filling the modeling system with liquid,
wherein said modeling system for vascular malformations is formed by the method comprising the steps of:
a) local heating of a first hollow body which is suited for conducting liquid and consists, at least in one or more partial areas, of a flexible, thermoplastically deformable material, such local heating being effected on at least one of the partial areas until the thermoplastically deformable material softens, and
b) subjecting the first hollow body to a pressure that is high enough to cause a deformation at the heated location, with the size of the deformation being governed by the duration of the pressure applied and/or by the intensity of the pressure applied.

29. The arrangement according to claim 28, further comprising a visual recording system.

30. The arrangement according to claim 28, wherein at least part of the modeling system is embedded in a liquid or gel.

31. The arrangement according to claim 28, wherein that the liquid filled in is an isotonic common salt solution, artificial blood or fresh blood.

32. The modeling system according to claim 26, wherein a hermetic closure of the first hollow body subjected to gas pressure after the deformation has been produced.

33. The modeling system according to claim 32, wherein the closure is effected by fusing or bonding together openings of the first hollow body.

34. The modeling system according to claim 26, wherein at least the deformation produced and preferably the entire first hollow body is formed to be translucent or transparent.

35. The modeling system according to claim 26, wherein the entire hollow body consists of flexible material.

36. The modeling system according to claim 26, wherein the entire hollow body consists of thermoplastically deformable material.

37. The modeling system according to claim 36, wherein the thermoplastically deformable material is PVC, PUR, PP or PE.

38. The modeling system according to claim 26, wherein the local heating is brought about by the local effect caused by a hot liquid, through the local effect caused by a flame, preferably a flame generated by a gas torch, through the local application of a hot wire, preferably a wire spiral or coil, or through the locally confined exposure to microwaves.

39. The modeling system according to claim 38, wherein the hot liquid is a lipophilic liquid having a high boiling point.

40. The modeling system according to claim 38, wherein the local heating is achieved through the application of a heat source external to the hollow body.

41. The modeling system according to claim 26, wherein the first hollow body is a system of two-dimensionally arranged pathways communicating with each other, or part of such a system.

42. The modeling system according to claim 41, wherein the system is produced by sticking together sectionally two plastic foils arranged one on top of the other by welding or bonding methods.

43. The modeling system according to claim 42, wherein the plastic foils are made of tearproof material.

44. The modeling system according to claim 26, wherein the first hollow body is designed as a hose, system of communicating hoses or part of such a system.

45. The modeling system according to claim 26, wherein the first hollow body, prior to heating, is placed at least partially into a second hollow body consisting of a material that cannot be thermoplastically deformed with at least a partial area of the second hollow body accommodating at least a partial area of the first hollow body in a form-closed manner.

46. The modeling system according to claim 45, wherein the second hollow body is of heatable construction and also effects heating of the first hollow body.

47. The modeling system according to claim 45, wherein the second hollow body is provided with at least one cut-out.

48. The modeling system according to claim 47, wherein the cut-out has an ellipsoidal or annular shape.

49. The modeling system according to claim 45, wherein the second hollow body is of one-piece construction and the first hollow body remains in it after the deformations have been produced.

50. The modeling system according to claim 45, wherein the second hollow body consists of at least two portions which can be interconnected with each other and at least partially disconnected, the connection of which is at least partially separated to allow the first hollow body to be accommodated prior to the method being carried out and removed after implementation of the method has been completed.

51. The modeling system according to claim 50, wherein the second hollow body consists of two parts that are slewably connected and can be snapped open or close.

52. The modeling system according to claim 45, wherein the second hollow body has a tubular form.

53. The modeling system according to claim 45, wherein the local heating is applied in a spotwise manner.

54. The modeling system according to claim 53, wherein the second hollow body has at least one cut-out and the first hollow body having been introduced into the second hollow body is heated in a spot-like manner from the outside in at least one of the areas located under the cut-outs.

55. The modeling system according to claim 52, wherein the first hollow body comprises a hose segment that fits in a form-closed manner into the second hollow body of tubular design, with the longitudinal dimension of said first body exceeding the length of the second hollow body so that after a partial area of the hose segment has been placed inside the tube and such partial area or areas of the hose segment not inside the tube have subsequently been heated up and subjected to pressure a dilatation of this or these areas will take place, with the non-heated partial area which is embraced by the form-closed tube will maintain its original diameter as well as its original wall thickness.

* * * * *